United States Patent Office 3,715,402
Patented Feb. 6, 1973

3,715,402
REMOVAL OF CATALYSTS FROM POLYOLS
Joseph F. Louvar, Lincoln Park, and Newlin S. Nichols, Dearborn, Mich., assignors to BASF Wyandotte Corporation, Wayne, Mich.
No Drawing. Filed Aug. 8, 1969, Ser. No. 848,740
Int. Cl. C07c 41/12
U.S. Cl. 260—613 B          7 Claims

ABSTRACT OF THE DISCLOSURE

A method for removing water-soluble impurities from water-insoluble polyethers which comprises providing a mixture of water, polyether, a solvent in which the polyether is soluble, and an acid. The solvent employed is substantially immiscible in water, has a density substantially different from water and is relatively inert with respect to the polyether and water, whereby a polyether-solvent solution is formed which is substantially immiscible in water. The solvent is employed in an amount sufficient to adjust the density differential between the polyether-solvent solution and water to at least about 0.03 gram per milliliter. The amount of the acid is sufficient to adjust the pH of the mixture to a value not greater than about 8.0. The polyether-solvent solution is then separated from the water by a suitable method such as electrostatic coalescence or subjection to centrifugal force. A stream of water containing dissolved therein the water-soluble impurities and a stream of polyether-solvent solution are separately recovered after the separation, followed by separating the solvent from the polyether-solvent solution.

---

Essentially water-insoluble hydroxyl-containing polyethers, hereafter, for convenience, called polyethers, are commonly used for the production of urethane polymers. The said polyethers are reacted with polyisocyanates, in the presence of added catalysts and other materials, to produce the polyurethane polymers which may be in the form of rubber-like elastomers, foams of flexible or rigid character, and the like. In order that urethane polymers of desired properties and characteristics be produced, it is important that the polyethers to be reacted with the polyisocyanates be essentially free of impurities which may function as undesirable catalysts or otherwise undesirably in the urethane polymer reaction.

Polyethers as commercially prepared, in crude form, contain, for instance, various water-soluble impurities such as alkali metal hydroxides or other metal salts. In general, present commercial practices for the removal of water-soluble impurities, generally speaking, involve treating the crude polyether with adsorbents, commonly clay-type absorbents, followed by filtration. Such known treatments, while reasonably effective for the removal of undesirable water-soluble impurities from the polyethers, have serious disadvantages because of economic considerations since they result in undue losses of the polyethers and they entail the costs for the adsorbent, the filtration operation, and adsorbent revivification if efforts are made to reuse the adsorbent after it has become spent. Ordinary water washing of the crude polyethers has not proved feasible because of the very small differences of the specific gravities of the polyethers and wash water.

In accordance with our copending patent applications Ser. No. 747,793, filed July 26, 1968, and Ser. No. 832,700, filed June 12, 1969 and now Pat. No. 3,582,491, a mixture of water, polyether, and a solvent in which the polyether is soluble is provided. This solvent is substantially immiscible in water, has a density substantially different from water and is relatively inert with respect to the polyether and water, whereby a polyether-solvent solution is formed which is substantially immiscible in water. The solvent is employed in an amount sufficient to adjust the density differential between the polyether-solvent solution and water to at least about 0.03 gram per milliliter. The polyether-solvent solution is then separated from the water by centrifugal force in application Ser. No. 747,793 and electrostatic coalescence wherein the polyether-solvent solutions is subjected to an electrostatic field which expedites coalescence of small droplets to form larger drops in application Ser. No. 832,700. A stream of water containing dissolved therein all of the water-soluble impurities and a stream of polyether-solvent solution are then separately recovered, followed by separating the solvent from the polyether-solvent solution by suitable means such as stripping. After separating the solvent from the polyether-solvent solution the solvent may be recycled.

In general, the impurities present in the polyether polyols which must be removed are catalysts used in the preparation of the polyether polyol. These catalysts are generally alkali metal hydroxides and alkali metal alkoxides, such as sodium hydroxide, potassium hydroxide, sodium alkoxide, potassium alkoxide, etc. Additional catalysts which may be employed in the preparation of such polyethers and which may be removed by the instant process include quaternary ammonium bases and the hydroxides and alkoxides of lithium, rubidium and cesium as well as well-known acid catalysts.

Crude polyether polyols which are in a basic state decompose to form soaps and aldehydes. Thus, during polyol preparation and particularly during the period between this preparation and the actual removal of the basic components a small quantity of soaps is generated. Generally, the longer this period of storage the larger the quantity of soaps generated. These soaps act as emulsifiers and, consequently, some polyols are virtually impossible to water-wash. Thus, while the process described above may be very effective in many instances for freshly produced polyol, the longer a polyol is stored before removal of the basic components the greater the quantity of these soaps is formed and the more difficult it is to remove the impurities by the above-described water-washing process.

Accordingly, it is a purpose of the instant invention to remove water-soluble impurities primarily catalyst from water-insoluble polyethers in which soaps are present as the result of decomposition during preparation and/or storage of said polyethers by a simple, efficient and effective process.

This end and other purposes of the instant invention are accomplished by the treatment of such polyols containing soaps with an acid whereby the soaps are converted to their corresponding acids which eliminates the emulsifying characteristic of the soap component. Polyols which are treated with the acid may be subjected to a water-wash process as described above for removal of the water-soluble impurities. As a result of the acidification, the efficiency of the above-described water-wash method of removing catalyst from polyols is greatly improved especially when large quantities of soaps are present in the polyoly and it is otherwise impossible or virtually impossible to water-wash the catalyst from the polyol. This process is also effective when smaller quantities of the soaps originally exist and water-washing produces polyol with marginal quality. The acid may be added to the polyol prior to mixing with water and solvent or it may be added to a mixture of polyol and water prior to adding solvent or it may be added to a mixture of polyol, water, and solvent or essentially all four may be mixed together simultaneously. The amount of acid employed is sufficient to adjust the pH of the mixture of polyether, water, solvent, and acid to a value not greater than about 8.0 and preferably about 5.0 to 8.0.

Thus, the over-all method for removing water-soluble impurities from water-insoluble polyethers in accordance with the instant invention comprises providing a mixture of water, polyether, a solvent in which the polyether is soluble and an acid. The solvent employed is substantially immiscible in water, has a density substantially different from water and is relatively inert with respect to the polyether and water whereby a polyether-solvent solution is formed which is substantially immiscible in water. The solvent is employed in an amount sufficient to adjust the density differential between the polyether-solvent solution and water to at least about 0.03 gram per milliliter. The amount of acid employed is sufficient to adjust the pH of the mixture to a value not greater than about 8.0. The polyether-solvent solution is then separated from the water by a suitable method, preferably centrifugal separation or electrostatic coalescence. A stream of water containing dissolved therein the water-soluble impurities and a stream of polyether-solvent solution are separately recovered, followed by separating the solvent from the polyether-solvent solution.

Suitable acids for the purpose of this invention include hydrochloric—HCl, hypochlorous—HClO, chlorous—HClO$_2$, phosphoric—H$_3$PO$_4$, nitrous—HNO$_2$, chloric—HClO$_3$, sulfuric—H$_2$SO$_4$, and oxalic—C$_2$H$_2$O$_4$·2H$_2$O.

Generally speaking, the polyethers, purified in accordance with the present invention, are those which are characterized as being essentially hydroxyl-terminated polyether polyols and they include the polyoxyalkylene ether glycols which have the general formula H(OR)$_n$OH where R is an alkylene radical and $n$ is an integer which in a preferred embodiment is sufficiently large that the compound as a whole has a molecular weight of about 300 to 10,000. The polyethers include, for example, the oxyalkylene adducts of polyol bases wherein the oxyalkylene portion is derived from monomeric units such as ethylene oxide, propylene oxide, butylene oxide and mixtures thereof. The polyol bases include, for example, 1,2-propylene glycol, 1,3-propylene glycol, 1,2-butanediol, 1,4-butanediol, hexanetriol, glycerol, trimethylolpropane, hydroquinone, bisphenol A, pentaerythritol, alpha-methyl glucoside, sorbitol and sucrose; polyethers such as polyethylene ether glycols, polypropylene ether glycols, polytetramethylene ether glycols, and alkylene oxide adducts of polyhydric alcohols including those listed above.

Typical polyether polyols include polyoxypropylene glycol, polyoxybutylene glycol, polytetramethylene glycol, block copolymers, e.g., combinations of polyoxypropylene and polyoxyethylene glycols, more specifically, those having the general formula:

$$HO(C_2H_4O)_n(C_3H_6O)_m(C_2H_4O)_nH$$

wherein $n$ and $m$ are together sufficient for attainment of the desired molecular weight, i.e., about 300 to 10,000. Also included are copolymers of poly-1,2-ozybutylene and polyoxyethylene glycols; and poly-1,4-oxybutylene and polyoxyethylene glycols; and random copolymer glycols prepared from blends, or sequential addition, of two or more alkylene oxides as well as glycols, as described above, capped with ethylene oxide units. The polyethers, purified in accordance with this invention, can contain arylene or cycloalkylene radicals together with the alkylene radicals as, for example, in the condensation product of a polyoxyalkylene ether glycol with a,a'-dibromo-p-xylene in the presence of alkali. In such products, the cyclic groups inserted in the polyether chain are preferably phenylene, naphthalene or cyclohexylene radicals or these radicals containing alkyl or alkylene substituents, as in the tolylene, phenylethylene or xylylene radicals.

Any solvent which is relatively inert with respect to water, catalyst and the polyether which is substantially immiscible in water, which has a density substantially different from water and in which the polyether is soluble may be employed as the solvent. A preferred solvent is hexane. Other solvents which may be employed include the butanes, pentanes, heptanes, octanes, nonanes, decanes, halogenated organics such as carbon tetrachloride, methylchloroform, dichlorodifluoromethane, 1,1,2-trichloro-1,2,2-trifluoroethane, perchloroethylene, fluoro, chloro, bromo, and iodo benzenes and toluenes; ethyl, propyl, butyl amyl, hexyl, and benzyl halides, particularly the chlorides, bromides, and iodides.

The amount of solvent employed should be sufficient to provide a solution of solvent and polyether which solution has a density differential with respect to water of at least about 0.03 gram per milliliter and preferably at least about 0.1 gram per milliliter. Substantially greater amounts may be employed but larger amounts merely require the use of more solvent which must be subsequently removed and, generally, the less solvent employed the better as long as a sufficient amount is present to obtain the desired density differential. The water is added generally in an amount ranging from about 0.1 to 4 parts of water per part of polyether by volume. The mixture of water, solvent, and polyether is preferably at a temperature above 20° C. before entering the centrifugal separation step or about 60° C. to 120° C. before entering the electrostatic coalescing step.

Centrifugal separation can be carried out with various types of commercial centrifugal separating equipment. The multiple gravitation forces utilized in the operation of such centrifugal separators will generally fall within the range of about 1500 to 4000 $g$'s and preferably about 2000 $g$'s, although satisfactory results can be obtained in the centrifugal separators operating at somewhat lesser as well as somewhat greater multiple gravitational forces. The commercial centrifugal separating equipment which is employed should be of a type that permits continuous countercurrent washing of the polyol-solvent-water mixture with water in order to improve the washing efficiency. An example of such commercial separating device is one marketed by Baker Perkins Incorporated, Saginaw, Mich. 48605, under the name Podbielniak Contactor which is disclosed in Bulletin No. P–100, published 1961. The temperature during the continuous separation and water washing is maintained above 20° C., preferably between 30° C. and 300° C. by conventional means such as one or more of the following: steam jacketed tanks or containers, steam-traced conduits, or shell and tube heat exchangers.

The proportion by weight of water added during centrifugal separation to the polyether-solvent-water mix is about 1:10 to 1:1.

Various types of commercial electrostatic coalescers, also called electric precipitators, may be employed for the separation step. Simply stated, an electric precipitator or coalescing unit consists of a vessel containing two or more electrodes—one grounded to the vessel and the other suspended by insulators, plus an electrical system through which an electrical potential is applied to the suspended electrodes. Numerous arrangements and configurations of electrodes have been employed in such devices and design parameters for such devices may be easily determined by one skilled in the art. Arrangement and spacing of electrodes depends on characteristics of the substances to be processed and process conditions. Intensity of the electrostatic field is controlled by spacing of electrodes and applied voltage. Feed rate is a major controlling factor in sizing vessels for coalescing units. Vessels are generally sized for a certain volume flow per unit time per square foot of cross-sectional area at the center line. Design rate of flow varies considerably for different applications. However, there is no decided disadvantage for oversizing from the standpoint of coalescing but there is a debit in the additional cost. The time in the electrostatic field is controlled by the electrode spacing and configuration. An example of a suitable commercial electric precipitator is one marketed by the Petrolite Corporation, Petreco Division of Houston, Tex., under the name Electrofining Metercell Precipitator referred to on page 3 of the booklet entitled "Petreco Distillate Treating" No. 6516–AC–5–M–1265.

Such a coalescer is also described in applicants' co-pending patent application Ser. No. 832,700 referred to above.

The following examples are provided to further illustrate the invention. In these examples the polyethers designated by letters A, B, etc., are as follows:

Polyether A is a glycerol-propylene oxide-ethylene oxide adduct having a molecular weight of about 3300 and containing about 12% by weight ethylene oxide units.

Polyether B is a glycerol-propylene oxide-ethylene oxide-ethylene oxide adduct having a molecular weight of about 3000 and containing about 9% by weight ethylene oxide.

Polyether C is a glycerol-propylene oxide-ethylene oxide adduct having a molecular weight of about 3700 and containing about 8% by weight ethylene oxide.

Polyether D is a glycerol-propylene oxide adduct having a molecular weight of about 3500 terminated with about 4% by weight of ethylene oxide units.

Polyether E is a glycerol-propylene oxide adduct having a molecular weight of about 3600 terminated with ethylene oxide units in the amount of about 3.0% by weight.

Polyether F is a glycerol-propylene oxide adduct having a molecular weight of about 2800 and containing ethylene oxide units in amount of about 12% by weight.

Polyether G is a polyoxypropylene glycol having a molecular weight of about 2000.

Polyether H is a polyoxypropylene adduct of trimethylolpropane having an average molecular weight of about 4500.

Polyether I is a polyoxyethylene adduct of a polyoxypropylene base having a molecular weight of about 1750 wherein the oxyethylene content is about 10 weight percent of the molecule.

Polyether J is hydroxypropylated bisphenol A having an average molecular weight of about 400.

Polyether K is a polyoxypropylene adduct of trimethylolpropane having a molecular weight of about 6000.

Polyether L is a glycerol-butylene oxide adduct having a molecular weight of 2000.

Polyether M is a polyoxypropylene glycol having a molecular weight of about 3000.

EXAMPLES 1–20

In the examples of Table I below employing Process A, the respective polyol indicated in the table is mixed with the "Premix" water in a 100-gallon steam-jacketed kettle in proportions by volume shown in Table I below, followed by addition of the $H_3PO_4$ in amount sufficient to adjust the pH of the mixture to 6.5 to 7.0 which amounts are shown in Table I below. The amounts needed are determined by titrating a sample of the polyol-water mixture with the $H_3PO_4$. The polyols of lots 1 and 4 are taken directly from the reactor in which they are prepared while the remaining polyols are stored polyols. The polyol-water mixture and hexane from a 50-gallon tank are each metered into a pipeline mixer in proportions to provide equal amounts by volume of polyether and hexane. The mixture is fed from the pipeline mixer into a continuous centrifugal separator at a temperature of 190° F. which temperature is achieved and maintained by the steam jacket of the kettle and by steam tracing the conduits.

In the examples of Table I below employing Process B, the respective polyol indicated in the table is mixed with hexane in the 100-gallon steam-jacketed kettle in proportions to provide a polyether-hexane mixture containing 50% hexane by volume. The "Premix" water is then added at a temperature of 190° F. to the polyether-solvent solution in the 100-gallon steam-jacketed kettle over a period of 10 minutes. The proportions by volume of "Premix" water to polyol are shown in Table I below. After addition of water is complete, the acid is added and the water, the polyether, the hexane, and acid are all mixed together and the mixture is passed directly to the centrifugal separator.

The continuous centrifugal separator employed in these examples is produced by Baker Perkins Incorporated, Saginaw, Mich. 48605, Podbielniak Contactor, Model No. 6150 as shown in Bulletin No. P–100, dated 1961. In both processes additional water is metered directly into the centrifugal separator. The rates in gallons per minute of the polyol plus hexane are shown in Table I below, along with the total water to polyol ratio by volume. The polyol-hexane solution obtained from the continuous centrifugal separator is stripped of hexane and the hexane recycled. The amounts of sodium and/or potassium ions shown in Table I below are determined by the following flame test:

This method is based upon a flame photometric analysis of the ash which is derived from the sample. The procedure includes (a) ashing the sample and (b) a flame photometric analysis of the ash. The Beckman DU Flame Photometer was calibrated with samples of known sodium and potassium analyses. In addition, Table I shows the amount of water present in the polyether-hexane solution and also the amount of polyol in the water obtained from the centrifugal separator after treatment. As can be seen from Table I, these amounts are reduced 50% or more with a given polyol lot when acid is added, thus demonstrating the effectiveness of the process of the instant invention.

TABLE I

| Ex. | Polyol | Lot | Process | $H_3PO_4$, ml./gal. of Polyol | Water | Polyether-hexane (g.p.m.) | Premix water/ polyol | Total water/ polyol | Polyether in water stream from separator (weight percent) | Treated Polyether Na+ + K+ (p.p.m.) | Polyol acid No. |
|---|---|---|---|---|---|---|---|---|---|---|---|
| 1 | A | 1 | B | 0 | Deionized | 1.0 | 0.60 | 1.0 | 1.5 | 31 | |
| 2 | A | 1 | B | 7.0 | do | 1.0 | 0.60 | 1.5 | 0.07 | 2 | 0.01 |
| 3 | A | 2 | B | 0 | do | 1.5 | 0.60 | 1.0 | 0.60 | 6 | |
| 4 | A | 2 | B | 12.3 | do | 1.5 | 0.60 | 1.0 | 0.01 | 2 | 0.004 |
| 5 | A | 2 | B | 13.4 | do | 1.5 | 0.60 | 1.0 | 0.05 | 2 | 0.02 |
| 6 | A | 2 | A | 0 | do | 1.5 | 0.60 | 1.0 | 0.07 | 3 | Nil |
| 7 | A | 2 | A | 13.3 | do | 1.5 | 0.60 | 1.0 | 0.02 | 2 | 0.005 |
| 8 | A | 2 | B | 13.3 | Detroit City | 1.0 | 0.60 | 1.0 | 0.01 | 2 | |
| 9 | A | 2 | B | 13.3 | do | 1.0 | 0.60 | 1.5 | 0.01 | 2 | |
| 10 | A | 2 | B | 13.3 | do | 1.5 | 0.60 | 1.5 | 0.01 | 2 | |
| 11 | B | 3 | A | 0 | Deionized | 1.5 | 0.60 | 1.0 | 0.004 | 4 | Nil |
| 12 | B | 3 | A | 13.3 | do | 1.5 | 0.60 | 1.0 | 0.01 | 2 | 0.005 |
| 13 | B | 4 | A | 0 | do | 1.5 | 0.60 | 1.0 | 0.01 | 2 | Nil |
| 14 | B | 4 | A | 13.3 | do | 1.5 | 0.60 | 1.0 | 0.01 | 1. | 0.006 |
| 15 | C | 5 | A | 0 | do | 1.5 | 0.04 | 1.0 | 0.07 | 2 | Nil |
| 16 | C | 5 | A | 13.3 | do | 1.0 | 0.60 | 1.0 | 0.06 | 1 | 0.003 |
| 17 | D | 6 | A | 0 | do | 1.5 | 0.60 | 1.0 | 0.04 | 1 | 0.003 |
| 18 | E | 7 | A | 13.3 | Detroit City | 1.5 | 0.60 | 1.0 | 0.05 | 2 | 0.014 |
| 19 | C | 8 | B | 0 | do | 1.5 | 0.04 | 1.0 | 0.08 | 5 | Nil |
| 20 | C | 8 | B | 13.3 | Deionized | 1.5 | 0.60 | 1.0 | 0.06 | 3 | 0.007 |

EXAMPLES 21-30

The compositions of Table II below are water washed according to Process B described in Examples 1–20 with the exception that solvents other than hexane and acids other than $H_3PO_4$ are employed in many examples.

As in Examples 1–20, the sodium-potassium ion concentration in the final product is very low.

TABLE II

| Ex. | Untreated polyether | Solvent | Acid | Polyether solvent (g.p.m.) | Premix water/ polyether | Total water/ polyether |
|-----|---------------------|---------|------|----------------------------|-------------------------|------------------------|
| 21  | G | Hexane | $H_2SO_4$ | 1.5 | 0.60 | 1.5 |
| 22  | H | Methylchloroform | $H_3PO_4$ | 1.5 | 0.60 | 1.5 |
| 23  | I | Cyclopentane | $H_3PO_4$ | 1.0 | 0.60 | 1.5 |
| 24  | J | Cyclohexane | $H_3PO_4$ | 1.5 | 0.60 | 1.0 |
| 25  | K | Heptane | $H_3PO_4$ | 1.5 | 0.60 | 1.0 |
| 26  | L | Hexane | HCl | 1.5 | 0.60 | 1.0 |
| 27  | M | 1,1,2-trichloro-1,2,2-trifluoroethane | $H_3PO_4$ | 1.0 | 0.60 | 1.0 |
| 28  | I | Hexane | HClO | 1.5 | 0.60 | 1.0 |
| 29  | I | ....do.... | $HNO_2$ | 1.5 | 0.60 | 1.0 |
| 30  | I | ....do.... | $C_2H_2O_4 \cdot 2H_2O$ | 1.5 | 0.60 | 1.0 |

EXAMPLE 31

In this example the glycerol-propylene oxide-ethylene oxide adduct, described above as Polyether B, is mixed with hexane in a 2-gallon steam-jacketed kettle in proportions to provide a polyether-hexane mixture containing 40% hexane by volume, followed by addition of $H_3PO_4$, in amount sufficient to adjust the pH of the mixture to 6.5 to 7.0. The polyol-hexane-acid mixture and water are each metered into an orifice mixer at a rate of 100 milliliters per minute of the polyol-hexane-acid mixture and 40 milliliters per minute of water. The mixture is fed at a temperature of 180° F. into a laboratory model Electrofining Metercell Precipitator of the type shown in FIG. 1 of the drawings of our copending U.S. patent application Ser. No. 832,700 described above. The potential employed is 4 volts and the current is 1.4 milliamps.

The polyol-hexane solution obtained from the precipitator is stripped of hexane. This process produces a polyol having a very low potassium-sodium ion concentration.

What is claimed is:

1. In a method for removing water-soluble alkali metal residual catalyst impurities from water-insoluble polyoxyalkylene ether polyol having a molecular weight of about 300 to 10,000 wherein a mixture of water, said polyol and a solvent is prepared, said solvent selected from a group consisting of butane, pentane, cyclopentane, hexane, cyclohexane, heptane, octane, nonane, decane, carbon tetrachloride, methylchloroform, dichlorodifluoromethane, 1,1,2-trichloro-1,2,2-trifluoroethane, perchloroethylene, fluoro-, chloro-, bromo- and iodobenzenes and toluenes, and ethyl, propyl, butyl, amyl, hexyl and benzyl chlorides, bromides and iodides, whereby a polyol-solvent solution is formed which is substantially immiscible with water, the amount of said solvent being sufficient to adjust the density differential between the polyol-solvent solution and water to at least about 0.03 gram per milliliter, wherein polyol-solvent solution is separated from said water by centrifugal means whereby a stream of water containing dissolved therein said alkali metal impurities and a stream of polyol-solvent solution are separately recovered and said solvent is then separated from said polyol-solvent solution, the improvement which comprises:

the addition of an acid selected from the group consisting of hydrochloric, hypochlorous, chlorous, phosphoric, nitrous, chloric, sulfuric and oxalic acids, prior to the separation of the mixture, in amounts sufficient to adjust the pH of said mixture to a value not greater than 8.0.

2. The process of claim 1 wherein said centrifugal separation of polyol-solvent solution from water is effected with simultaneous washing of said polyol-solvent solution with water.

3. The process of claim 1 wherein the amount of said acid is sufficient to adjust the pH of said mixture to a value of from about 5.0 to 8.0.

4. The process of claim 3 wherein said mixture of water, polyol, solvent, and acid is at a temperature greater than 20° C. and said centrifugal separation is carried out at a temperature greater than 20° C.

5. The process of claim 2 wherein the amount of water in said initial water-polyol-solvent mixture is in a proportion of from about 0.1 to 4 parts by volume.

6. The process of claim 5 wherein the water employed for said simultaneous washing and centrifugal separation is in a proportion by weight from about 1:10 to 1:1 water to polyol-solvent solution.

7. The method of claim 1, wherein the polyoxyalkylene ether polyols are alkylene oxide adducts of polyol bases, said alkylene oxides selected from the group consisting of ethylene oxide, propylene oxide or butylene oxide, and said polyol bases selected from the group consisting of 1,2-propylene glycol, 1,3-propylene glycol, 1,2-butanediol, 1,4-butanediol, hexanetriol, glycerol, trimethylolpropane, hydroquinone, bisphenol A, pentaerythritol, alpha-methylglycoside, sorbitol and sucrose.

References Cited

UNITED STATES PATENTS

| | | | |
|---|---|---|---|
| 2,228,929 | 1/1941 | Reibnitz | 260—610 |
| 2,723,294 | 11/1955 | Benoit | 260—616 |
| 3,299,151 | 1/1967 | Wismer et al. | 260—616 |

OTHER REFERENCES

Brown et al., Unit Operations (1953), 297–299.

BERNARD HELFIN, Primary Examiner

U.S. Cl. X.R.

260—615 B, 611 B, 210 R; 210—78; 204—186, 180